US010331597B2

(12) United States Patent
Chuang et al.

(10) Patent No.: US 10,331,597 B2
(45) Date of Patent: Jun. 25, 2019

(54) USB TYPE-C SWITCHING CIRCUIT

(71) Applicant: REALTEK SEMICONDUCTOR CORP., Hsinchu (TW)

(72) Inventors: Bing-Juo Chuang, Hsinchu (TW); Feng-Cheng Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 226 days.

(21) Appl. No.: 15/384,538

(22) Filed: Dec. 20, 2016

(65) Prior Publication Data

US 2018/0032460 A1 Feb. 1, 2018

(30) Foreign Application Priority Data

Jul. 27, 2016 (TW) .............................. 105123690 A (51) Int. Cl.
*G06F 13/38* (2006.01)
*G06F 13/40* (2006.01)
*G06F 13/42* (2006.01)
*G06F 3/06* (2006.01)

(52) U.S. Cl.
CPC ........ *G06F 13/385* (2013.01); *G06F 13/4022* (2013.01); *G06F 13/4282* (2013.01); *G06F 13/4295* (2013.01); *G06F 2213/0042* (2013.01)

(58) Field of Classification Search
None
See application file for complete search history.

(56) References Cited

U.S. PATENT DOCUMENTS

2015/0268688 A1* 9/2015 Leinonen .............. G06F 13/409
307/147
2018/0048094 A1* 2/2018 Cornelius .......... H01R 13/6473

FOREIGN PATENT DOCUMENTS

| CN | 100341072 C | 10/2007 |
| CN | 204179435 U | 2/2015 |
| CN | 105608035 A | 5/2016 |

* cited by examiner

*Primary Examiner* — Scott C Sun
(74) *Attorney, Agent, or Firm* — Li & Cai Intellectual Property (USA) Office (57) ABSTRACT

Disclosed is a USB Type-C switching circuit configured for arranging a plurality of signals of a USB Type-C connector. The USB Type-C switching circuit can be used in products having DisplayPort Alternate mode, and includes a plurality of signal receivers/receivers, a plurality of series-parallel transforming circuits and a multiplexer. The signal receivers/receivers are connected to the USB Type-C connector to receive/transmit signals. The series-parallel transforming circuits are connected to the signal receivers/receivers to convert the signals between a parallel domain and a serial domain. The multiplexer is connected to the series-parallel transforming circuits to arrange the signals in the parallel domain according to a control signal.

10 Claims, 6 Drawing Sheets

A:control signal

FIG. 5B

USB TYPE-C SWITCHING CIRCUIT

BACKGROUND OF THE INVENTION

1. Field of the Invention

The instant disclosure relates to a USB Type-C switching circuit. By having this USB Type-C switching circuit, when using a USB Type-C connector, the signal path can be arranged without an external Port controller or a Port Mux. In this manner, signal integrity can be improved, the system cost can be reduced and the product can have a smaller volume.

2. Description of Related Art

Figure 2:
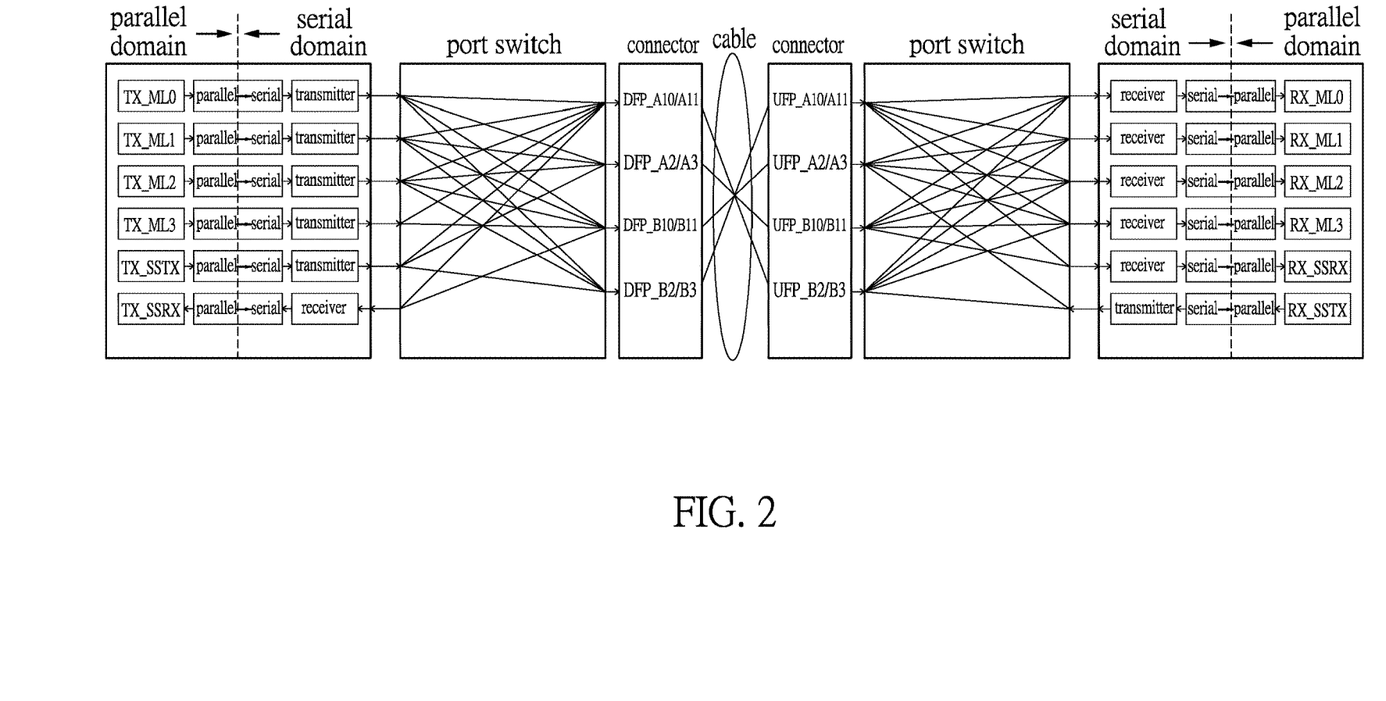
FIG. 2 shows a schematic diagram of the signal arrangement of a traditional Port controller or a Port Mux.

Currently, the USB Type-C products at least meet two requirements. One is to allow a USB Type-C connector to be plugged in in a reverse plug orientation. The other one is that, in the DisplayPort Alternate Mode on USB TYPE-C, a USB 3.x signal and a DisplayPort signal should be able to be transmitted at the same time. Usually, an external Port Switch or a Port Mux is used to meet the above two requirements. FIG. 2 shows how the Port Switch or the Port Mux works.

The Port Switch or the Port Mux is mainly used to arrange the signal path of the USB/DisplayPort high-speed signal. When a USB Type-C connector is plugged in, the system can obtain the information relevant to the plug and the receptacle according to the USB Type-C specification and connector configuration, and accordingly know the plug orientation of this USB Type-C connector. Details about the connector configuration can be known according to the USB Type-C specification, so they are not going to be discussed herein. However, it should be noted that, the plug orientation of the USB Type-C connector affects the signal arrangement, so there is usually an external Port Switch or the Port Mux needed.

The external Port Switch or the Port Mux may result in additional loss within the signal path, such as the insertion loss and the return loss which results from bad impedance match. These losses badly affect the signal integrity of the high-speed signal, such as a DisplayPort1.x signal or a USB3.x signal. The current high speed signal transmission technology requires a higher transmission speed, such as 10 Gbs for the USB3.1 version, but the higher transmission speed makes the signal transmission more affected by the above losses. This problem is a challenge for the chip designers, and also the users have bad user experiences.

It has become a trend for products having USB ports to have a small volume. However, for the common USB Type-C products, there are two or more than two chips configured on their PCB. One is for an external Port Switch or Port Mux, and another one is for USB Hub. Thus, the external Port Switch or Port Mux makes the common USB Type-C products unlikely to have a smaller volume. More chips are configured on the PCB, and the PCB has a larger volume.

To sum up, the external Port Switch or Port Mux may make the common USB Type-C products meet the above requirements, but there are still problems left. It is worth discussing how to implement the signal arrangement without the external Port Switch or Port Mux, which could improve the product performance, reduce the system cost and shrink the volume of the PCB.

SUMMARY OF THE INVENTION

The instant disclosure provides a USB Type-C switching circuit, configured for arranging a plurality of signals of a USB Type-C connector. The USB Type-C switching circuit can be used in products having a DisplayPort Alternate mode, and comprises a plurality of signal receivers/transmitters, a plurality of series-parallel transforming circuits and a multiplexer. The signal receivers/transmitters are connected to the USB Type-C connector to receive/transmit signals. The series-parallel transforming circuits are connected to the signal receivers/transmitters to convert the signals between a parallel domain and a serial domain. The multiplexer is connected to the series-parallel transforming circuits to arrange the signals in the parallel domain according to a control signal.

In the USB Type-C switching circuit provided by the instant disclosure, the signal path will not be corrected outside the chip by an external port switch. Instead, the signal path is arranged inside the present system chip. In other words, after the signal is transmitted into the chip, the signal path arrangement is implemented by the present system chip. In this manner, an external interface controller becomes unnecessary, which can improve the product performance, lower the system cost and reduce the area of the PCB. In addition, in the instant disclosure, before the signal path is switched, the signal is converted from a serial signal to a parallel signal by a multiplexer, which decreases the difficulty of the signal process and further simplifies the design of the serial signal switch for reducing the system cost.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element or region from another element or region. For example, a first element could be termed a second element, and, similarly, a second element could be termed a first element, without departing from the scope of example embodiments of the present invention. As used herein, the term "and/or" includes any and all combinations of one or more of the associated listed items.

Figure 1:
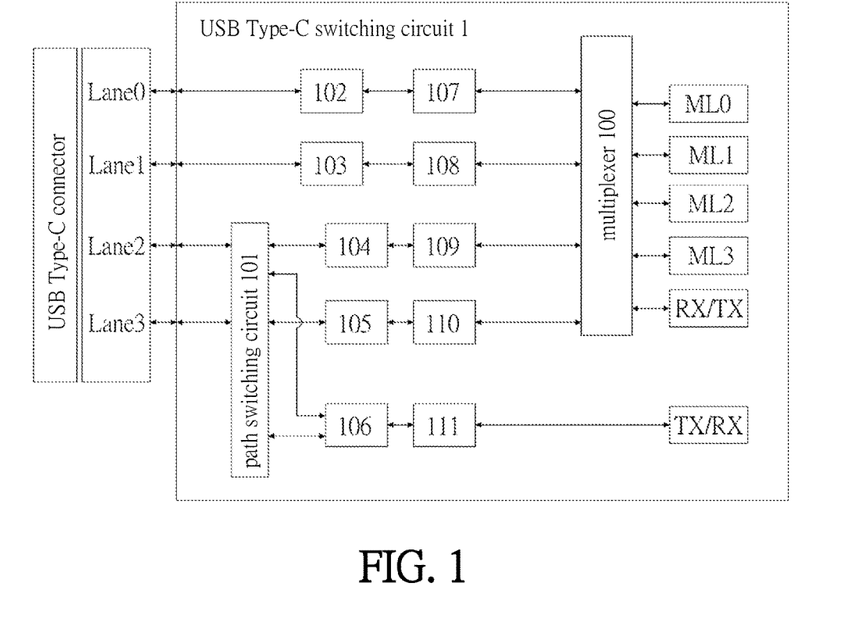
FIG. 1 shows a block diagram of a USB Type-C switching circuit of one embodiment of the instant disclosure.

These are embodiments provided for illustrating the USB Type-C switching circuit of the instant disclosure in the following description. Referring to FIG. 1, FIG. 1 shows a block diagram of a USB Type-C switching circuit of one embodiment of the instant disclosure. As shown in FIG. 1, the USB Type-C switching circuit 1 can be used in relevant applications of the USB Type-C connector. The USB Type-C switching circuit 1 comprises a plurality of signal transmitters/receivers 102, 103, 104, 105 and 106, a path switching circuit 101, a multiplexer (MUX) 100, and a plurality of series-parallel transforming circuits 107, 108, 109, 110 and 111. The signal transmitters/receivers 102, 103, 104, 105 and 106 are configured among the USB Type-C connector CON, the DisplayPorts ML0-ML3, the USB reception/transmission port RX/TX and the USB transmission/reception port TX/RX, to receive/transmit signals with respect to the USB Type-C connector CON. The USB Type-C connector CON has lanes Lane 0, Lane 1, Lane 2 and Lane 3. The series-parallel transforming circuits 107, 108, 109, 110 and 111 are connected to the signal transmitters/receivers 102, 103, 104, 105 and 106, and convert signals between the parallel domain and the serial domain.

The path switching circuit 101 is connected between the USB Type-C connector CON and the signal transmitters/receivers 104, 105 and 106. Preferably, the signal transmitter/receiver 106 is selectively connected to the lanes Lane2 and the Lane3 of the USB Type-C connector CON. The MUX 100 is connected between the series-parallel transforming circuits 107, 108, 109 and 110, the DisplayPorts ML0-ML3 and the USB reception/transmission port RX/TX to arrange signals therebetween.

The main achievement of the instant disclosure is to arrange signal paths by the present system chip. In the prior art, the signal path switching is implemented by an external Port controller or Port Mux in a high-speed serial domain; however, in the instant disclosure, the signal path switching is implemented inside the present system chip in a low-speed parallel domain. Referring to FIG. 2, FIG. 2 shows a schematic diagram of the signal arrangement of an external Port controller or Port Mux. The external Port controller or Port Mux is configured between a connector and a corresponding system chip. However, in the instant disclosure, the signal path will not be corrected outside the system chip. After the signal is transmitted to the system chip, the signal path will be arranged by the system chip.

In the DisplayPort Alternate Mode on USB TYPE-C, the SINK end is also called the Upstream facing Port (UFP), and the SOURCE end is also called the Downstream facing Port (DFP). For both of the SINK end and the SOURCE end, the USB and the DisplayPort may have the signal path arrangement as shown in FIG. 2. The lanes Lane0~Lane3 of the USB Type-C connector are respectively the lanes A10-A11, B10-B11, A2-A3 and B2-B3 under the USB TYPE-C standard to transmit differential signals. Different kinds of signals may be transmitted into the lanes Lane0~Lane3 of the USB Type-C connector. For example, the USB signal corresponds to the USB reception end RX/transmission end TX, and the DisplayPort signal corresponds to the DisplayPorts ML0/ML1/ML2/ML3. Thus, for an external Port controller or Port Mux, the signal paths will be complex, and at least one 4 to 6 multiplexer is needed to arrange the signal path well. In the prior art, an interface control chip is configured between the connector and the SOURCE end of the system chip, or configured between the connector and the SINK end of the system chip; however, this configuration may result in additional losses within the signal path.

In this embodiment, to normally receive all signals from the connector without an external Port controller or Port Mux, the USB Type-C switching circuit needs at least four pairs of input signals. At the SINK end and the SOURCE end, lanes of the USB Type-C connector CON may correspond to signals as shown in the following table (Table 1).

TABLE 1

Possible combination of Lanes

| | | | | | | | |
|---|---|---|---|---|---|---|---|
| USB Host/DisplayPort TX(DFP) | | | | | | | |
| Lanes of connector | DFP_A10-A11 (Lane0) | TX_ML0 | TX_ML1 | TX_ML2 | TX_ML3 | | TX_SSRX |
| | DFP_A2-A3 (Lane2) | TX_ML0 | TX_ML1 | TX_ML2 | | | TX_SSTX |
| | DFP_B10-B11 (Lane1) | TX_ML0 | TX_ML1 | TX_ML2 | TX_ML3 | | TX_SSRX |
| | DFP_B2-B3 (Lane3) | TX_ML0 | TX_ML1 | TX_ML2 | | | TX_SSTX |
| USB Device/DisplayPort RX(UFP) | | | | | | | |
| Lanes of connector | UFP_A10-A11 (Lane0) | RX_ML0 | RX_ML1 | RX_ML2 | RX_ML3 | | RX_SSRX |
| | UFP_A2-A3 (Lane2) | RX_ML0 | RX_ML1 | RX_ML2 | RX_ML3 | | RX_SSTX |
| | UFP_B10-B11 (Lane1) | RX_ML0 | RX_ML1 | RX_ML2 | RX_ML3 | | RX_SSRX |
| | UFP_B2-B3 (Lane3) | RX_ML0 | RX_ML1 | RX_ML2 | RX_ML3 | | RX_SSTX |

As shown by the above table, for the same lane, there may be the signal conversion and changes of the signal transmission direction. The conversion between a USB signal and a DisplayPort signal is the signal conversion, and the conversion between a USB reception signal and a USB transmission signal involves in a change of the signal transmission direction. During the high-speed signal transmission, it is hard for the external Port controller or Port Mux to process the high frequency signal in the serial domain, because the external Port controller or Port Mux is responsible for switching signal paths, reducing losses and any kind of non-ideal effects, such as crosstalk. Thus, it is hard for an external Port controller or Port Mux to meet all the designing requirements. To solve this problem, in the instant disclosure, the signal path is arranged in the system chip such that the signal is switched not in serial domain, but in parallel domain after the signal is converted from serial domain, thus reducing loss and other unwanted effects. The following description is to illustrate the signal conversion between the parallel domain and the serial domain.

Figure 3:
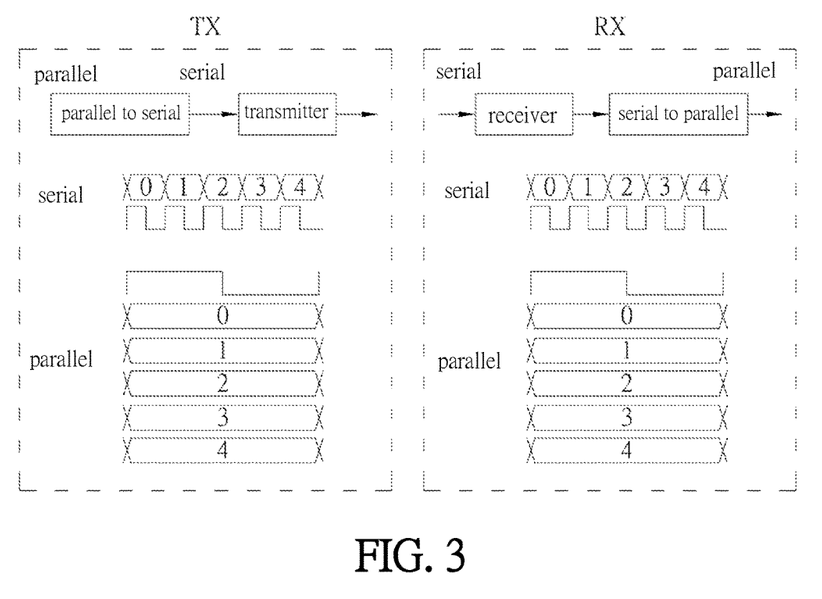
FIG. 3 shows a schematic diagram of the signal conversion between a parallel domain and a serial domain.

Referring to FIG. 3, FIG. 3 shows a schematic diagram of the signal conversion between a parallel domain and a serial domain. For a common signal receiver/transmitter, there is usually a configuration as shown in FIG. 3. For a USB transmission port TX, a parallel signal is first converted to a serial signal, and then is transmitted from the USB transmission port TX. After that, the USB reception port RX receives the serial signal, and then converts it to a parallel signal. The differences between the serial signal and the parallel signal are the transmission speed and the Bit width. According to the embodiment shown in FIG. 3, the transmission speed of the serial signal is five times the transmission speed of the parallel signal; however, though the Bit width of the parallel signal is five times the Bit width of the serial signal to support the data traffic, it is not limited herein.

Figure 4A:
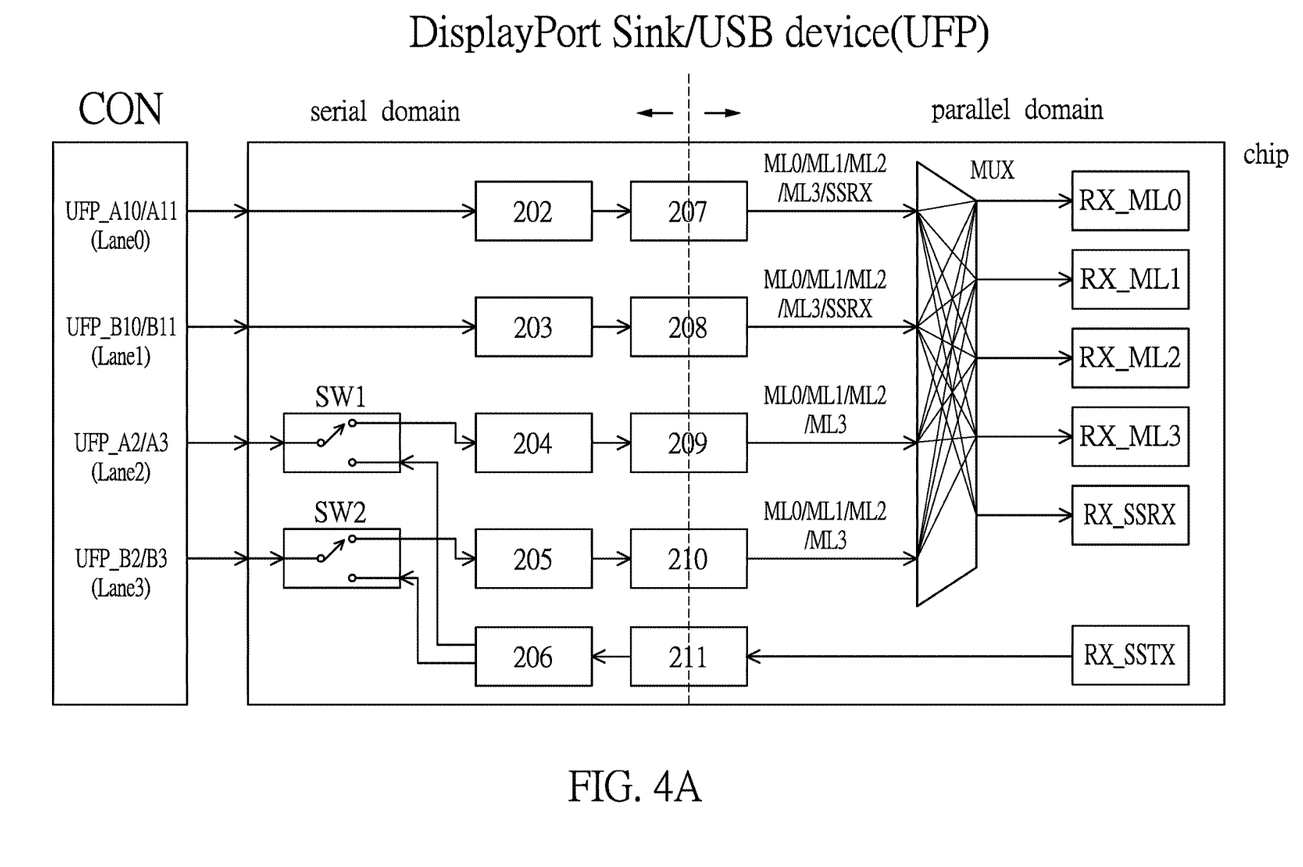
FIG. 4A and FIG. 4B show circuit diagrams of the SINK end and the SOURCE end of a USB Type-C switching circuit of one embodiment of the instant disclosure.

Referring to FIG. 4A, FIG. 4A shows a circuit diagram of the SINK end of a USB Type-C switching circuit of one embodiment of the instant disclosure. As shown in FIG. 4A, the DisplayPort signal/USB signal from the USB reception port RX is transmitted to a chip through the lanes Lane0/Lane1 of the USB Type-C connector CON. The lanes Lane0/Lane 1 have a receiver structure, so according to the table 1, even if there is difference between the transmission speed of a USB signal and a DisplayPort signal (such as the DisplayPort image signal and the USB reception signal), the signal receivers 202, 203, 204 and 205 can be designed well to receive the corresponding signal. After that, the signal is converted from a serial signal to a parallel signal through the series-parallel transforming circuits 207, 208, 209 and 210, and the signal transmission speed is lowered in parallel domain. Then, a multiplexer MUX can switch the signal path in parallel signal domain. Because the signal is converted from a high speed serial signal to a low speed parallel signal, it will be easier to design the circuit to switch signal.

As shown by the Table 1, at the SINK end, for the lanes Lane2/Lane3, there may be a USB signal from the USB transmission port TX/DisplayPort signal inputted. Thus, the path switching circuit has two 1 to 2 switches SW1 and SW2 to switch the signal path. When a DisplayPort signal is inputted, this DisplayPort signal is received by receivers 204, 205. After that, the DisplayPort signal is converted from the serial domain to the parallel domain, and is transmitted to the DisplayPort of the USB Type-C switching circuit. When a USB signal from the USB transmission port TX is outputted, this USB signal is converted from the parallel domain to the serial domain by the series-parallel transforming circuit 211, and then is transmitted by the signal transmitter 206. After that, the path switching circuit switches the signal path of this USB signal to lanes Lane2/Lane3. In the configuration of the USB Type-C switching circuit provided by the instant disclosure, there is no additional Port controller or Port Mux between a system chip and a connector. However, in this manner, this embodiment still has all possible signal path switches in the DisplayPort Alternate Mode on USB TYPE-C.

Compared to the prior art, the instant disclosure has an advantage that the difficulty of circuit design can be reduced because the signal path arrangement is implemented in the parallel domain wherein the signal transmission speed is slower. In addition, without an external Port controller or Port Mux, the loss resulting from the first stage multiplexer can be reduced, which provides a better signal integrity. Moreover, without an external Port controller or Port Mux configured on the PCB, the PCB can have a smaller volume, and then the system cost and the chip cost can be also reduced.

Figure 4B:
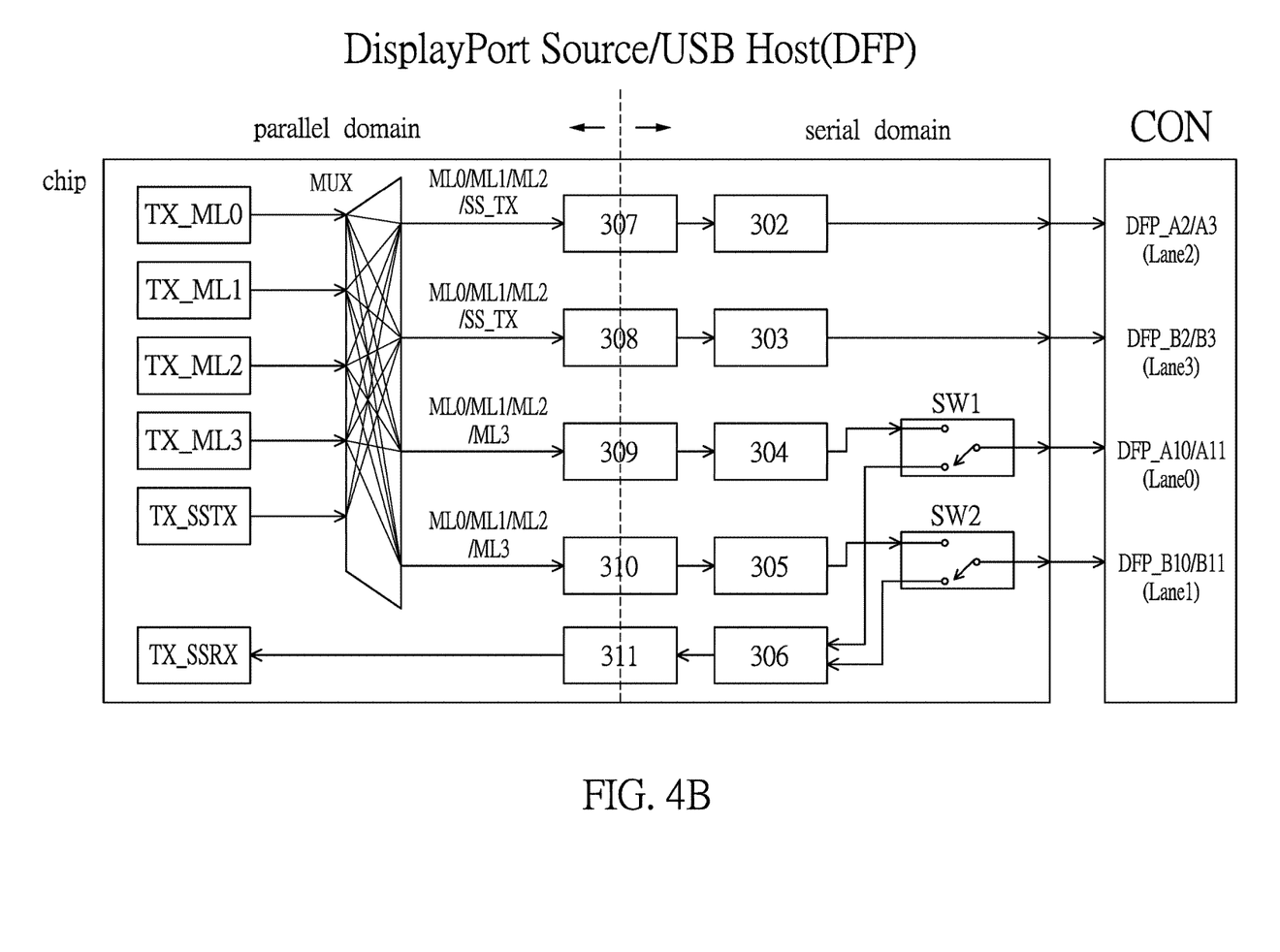

Referring to FIG. 4B, FIG. 4B shows a circuit diagram of the SOURCE end of a USB Type-C switching circuit of one embodiment of the instant disclosure. Comparing with the SINK end, the signal transmission direction is opposite at the SOURCE end. At the SINK end, for the lanes Lane2/Lane3, the DisplayPort output signal/USB transmission signal is converted from a parallel signal to a serial signal through the series-parallel transforming circuit 307, 308, 309, 310. Then the converted DisplayPort output signal/USB transmission signal is outputted by the signal transmitters 302, 303, 304 and 305. At the SOURCE end, there may be a DisplayPort output signal/USB reception signal. In this case, by using the path switching circuit, such as a 1 to 2 switch SW1 and SW2, the USB reception signal is received by the signal receiver 306, then is converted from a serial signal to a parallel signal through the series-parallel transforming circuit 311, and then is received by the USB reception end. In these cases, there is no need to have an external Port controller or Port Mux, which is also the major idea of the instant disclosure. It is worth mentioning that, in the instant disclosure, if there is only DisplayPort signal but no USB signal, the path switching circuit SW1, SW2 is not necessary.

Figure 5A:
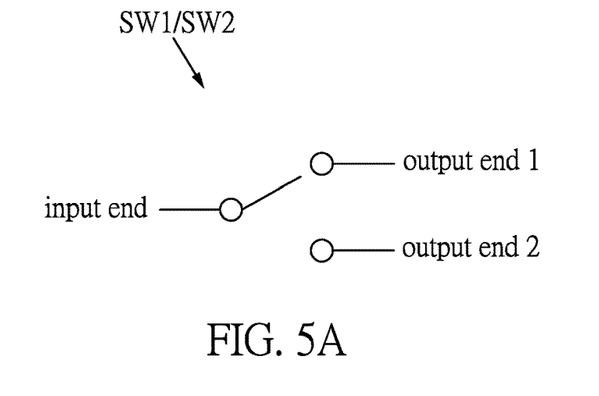
FIG. 5A and FIG. 5B show circuit diagrams of part of a USB Type-C switching circuit of one embodiment of the instant disclosure.
Figure 5B:
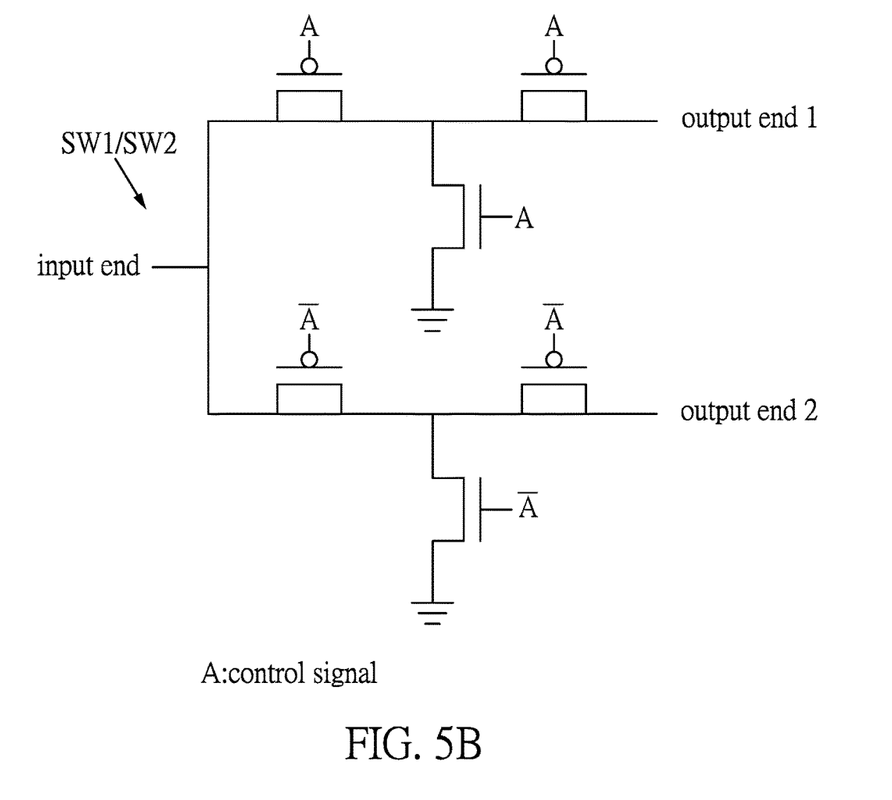

Referring to FIG. 5A and FIG. 5B, FIG. 5A and FIG. 5B show circuit diagrams of part of a USB Type-C switching circuit of one embodiment of the instant disclosure. As shown in FIG. 5A and FIG. 5B, the path switching circuit comprises a 1 to 2 switch SW1 and SW2. Specifically speaking, the switch SW1 and the switch SW2 can be two pairs of transistors. The 1 to 2 switch receives a control signal A or an inverse control signal A and accordingly chooses to turn on a first output end and a second output end. When the first output end is turned on, the second output end will be turned off, and vice versa.

To sum up, in the USB Type-C switching circuit provided by the instant disclosure, the signal path will not be corrected outside the chip by an external port switch. Instead, the signal path is arranged inside the system chip. In other words, after the signal is transmitted into the chip, the signal path arrangement is implemented by the system chip. In this manner, an external interface controlled becomes unnecessary, which can improve the product performance, can lower the system cost and can shrink the PCB. In addition, in the instant disclosure, before the signal path is switched, the signal is converted from a serial signal to a parallel signal by a multiplexer, which decreases the difficulty of the signal processing and further simplifies the design of the serial signal switch for reducing the system cost.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A USB Type-C switching circuit, configured for arranging a plurality of signals of a USB Type-C connector, comprising:
   a plurality of signal receivers/transmitters, connected to the USB Type-C connector to receive/transmit signals;
   a plurality of series-parallel transforming circuits, connected to the signal receivers/receivers to convert the signals between a parallel domain and a serial domain; and
   a multiplexer, connected to the series-parallel transforming circuits to arrange the signals in the parallel domain according to a control signal and installed within the USB Type-C switching circuit.

2. The USB Type-C switching circuit according to claim 1, wherein the multiplexer is further connected to a plurality of Display Ports and a plurality of USB transmission/reception ports to arrange the signals in the parallel domain with respect to the Display Ports and the USB transmission/reception ports.

3. The USB Type-C switching circuit according to claim 1, further comprising a path switching circuit, wherein the path switching circuit is connected among the signal transmitters/receivers and the USB Type-C connector to make the signal transmitters/receivers selectively receive/transmit the signals.

4. The USB Type-C switching circuit according to claim 3, wherein the path switching circuit comprising a 1-to-2 switch.

5. A USB Type-C switching circuit, configured for arranging a plurality of signals of a USB Type-C connector in a SINK mode, comprising:
   a plurality of signal receivers, connected to the USB Type-C connector to receive the signals;
   a signal transmitter, connected to the USB Type-C connector to transmit the signal;
   a plurality of series-parallel transforming circuits, connected to the signal receivers and the signal transmitter to convert the signals between a parallel domain and a serial domain; and
   a multiplexer, connected to the series-parallel transforming circuits to arrange signals in the parallel domain according to a control signal and installed within the USB Type-C switching circuit.

6. The USB Type-C switching circuit according to claim 5, wherein the multiplexer is further connected to a plurality of Display Ports and a plurality of USB reception ports to arrange the signal in the parallel domain with respect to the Display Ports and the USB reception ports.

7. The USB Type-C switching circuit according to claim 5, further comprising a path switching circuit, wherein the path switching circuit is connected among the signal receivers, the signal transmitters and the USB Type-C connector to make the signal transmitters and the signal receivers selectively receive and transmit the signals.

8. A USB Type-C switching circuit, configured for arranging a plurality of signals of a USB Type-C connector in a SOURCE mode, comprising:
   a plurality of signal transmitters, connected to the USB Type-C connector to transmit the signals;
   a signal receiver, connected to the USB Type-C connector to receive the signals;
   a plurality of series-parallel transforming circuits, connected to the signal transmitters and the signal receivers to convert the signals between a parallel domain and a serial domain; and
   a multiplexer, connected to the series-parallel transforming circuit to arrange signals in the parallel domain according to a control signal and installed within the USB Type-C switching circuit.

9. The USB Type-C switching circuit according to claim 8, wherein the multiplexer is further connected to a plurality of Display Ports and a plurality of USB transmission ports to arrange the signals in the parallel with respect to the Display Ports and the USB transmission ports.

10. The USB Type-C switching circuit according to claim 8, further comprising a path switching circuit, wherein the path switching circuit is connected among the signal transmitter, the signal receiver and the USB Type-C connector to make the signal transmitters and the signal receivers selectively transmit and receive the signals.

* * * * *